United States Patent
Baltes

(10) Patent No.: US 11,826,957 B2
(45) Date of Patent: Nov. 28, 2023

(54) REUSABLE BUILD SURFACE FOR 3D PRINTED OBJECTS

(71) Applicant: Toybox Labs, LLC, Oakland, CA (US)

(72) Inventor: Benjamin Baltes, Oakland, CA (US)

(73) Assignee: Toybox Labs, LLC, Oakland, CA (US)

( * ) Notice: Subject to any disclaimer, the term of this patent is extended or adjusted under 35 U.S.C. 154(b) by 763 days.

(21) Appl. No.: 16/056,546

(22) Filed: Aug. 7, 2018

(65) Prior Publication Data

US 2019/0047221 A1 Feb. 14, 2019

Related U.S. Application Data

(60) Provisional application No. 62/542,472, filed on Aug. 8, 2017.

(51) Int. Cl.
*B29C 64/245* (2017.01)
*B29C 64/176* (2017.01)
(Continued)

(52) U.S. Cl.
CPC .......... *B29C 64/245* (2017.08); *B29C 64/106* (2017.08); *B29C 64/176* (2017.08); *B29C 64/209* (2017.08); *B29C 64/379* (2017.08); *B32B 7/12* (2013.01); *B32B 25/08* (2013.01); *B32B 25/16* (2013.01); *B32B 27/30* (2013.01); *B33Y 10/00* (2014.12); *B33Y 30/00* (2014.12); *B29C 64/223* (2017.08); *B29C 64/393* (2017.08); *B29K 2811/00* (2013.01);
(Continued)

(58) Field of Classification Search
CPC ....... B29C 64/00; B29C 64/20; B29C 64/223; B29C 64/245; B33Y 10/00; B33Y 30/00; B33Y 50/00; B33Y 70/00; B32B 2307/208; B29K 2995/0008
USPC ........................................................ 700/117
See application file for complete search history.

(56) References Cited

U.S. PATENT DOCUMENTS

| | | | |
|---|---|---|---|
| 2002/0106614 A1* | 8/2002 | Prince ................. | G09B 21/003 434/114 |
| 2015/0037527 A1 | 2/2015 | Jacobs et al. | |

(Continued)

FOREIGN PATENT DOCUMENTS

| | | | |
|---|---|---|---|
| CN | 205997371 U | 3/2017 | |
| NL | 2014771 A * | 5/2015 | .......... B29C 64/245 |

OTHER PUBLICATIONS

The thermal conductivity of rubbers/elastomers, Electronics Cooling Magazine (2001); NPL_1 (Year: 2001).*

(Continued)

*Primary Examiner* — Francisco W Tschen
*Assistant Examiner* — Edgaredmanuel Troche
(74) *Attorney, Agent, or Firm* — Cooley LLP

(57) ABSTRACT

One embodiment of the invention may relate to a print surface for a three-dimensional object printer. The print surface may comprise an elastic first layer, a binding layer for securing the printing surface to the three-dimensional object printer; and an adhesive layer for adhering the first layer to the binding layer. Three-dimensional objects are printed onto the first layer by controlled extrusion of molten material. Printed objects can be obtained by decoupling the binding layer from the three-dimensional object printer and detaching the object from the first layer by applying bending moments.

3 Claims, 5 Drawing Sheets

(51) Int. Cl.
- *B32B 25/08* (2006.01)
- *B33Y 30/00* (2015.01)
- *B29C 64/223* (2017.01)
- *B32B 7/12* (2006.01)
- *B29C 64/106* (2017.01)
- *B29C 64/379* (2017.01)
- *B32B 27/30* (2006.01)
- *B32B 25/16* (2006.01)
- *B29C 64/209* (2017.01)
- *B33Y 10/00* (2015.01)
- *B29C 64/393* (2017.01)
- *B33Y 50/02* (2015.01)

(52) U.S. Cl.
CPC ... *B29K 2995/0008* (2013.01); *B32B 2250/02* (2013.01); *B32B 2250/24* (2013.01); *B32B 2255/10* (2013.01); *B32B 2255/26* (2013.01); *B32B 2307/208* (2013.01); *B32B 2307/51* (2013.01); *B33Y 50/02* (2014.12)

(56) References Cited

U.S. PATENT DOCUMENTS

| | | | |
|---|---|---|---|
| 2017/0036403 A1* | 2/2017 | Ruff | C09D 109/08 |
| 2017/0252980 A1* | 9/2017 | Kelley | B32B 27/12 |
| 2019/0322047 A1* | 10/2019 | Riha et al. | B29D 7/01 |
| 2020/0070408 A1* | 3/2020 | Elsey | B29C 64/245 |

OTHER PUBLICATIONS

Polycarbonate of Bisphenol A (PC); NPL_2; Retreived from http://gallinausa.com/wp-content/uploads/2013/01/Polycarbonate.Bisphenol.A.pdf (Year: 2013).*

Mark, James E., "Thermoset Elastomers," 2017, Applied Plastics Engineering Handbook 2nd edition, Processing, Materials, and Applications, Plastics Design Library, pp. 109-125. (Year: 2017).*

"The thermal conductivity of rubbers/elastomers | Electronics Cooling"—NPL1; (2001) (Year: 2001).*

"Thermoset Rubber" Ritus Corporation; Retreived from https://ritus.com/product/thermoset-rubber/ (Year: 2014).*

* cited by examiner

REUSABLE BUILD SURFACE FOR 3D PRINTED OBJECTS

CROSS-REFERENCE TO RELATED APPLICATIONS

This application claims the benefit of U.S. Provisional Patent Application No. 62/542,472 filed on Aug. 8, 2017, which is hereby incorporated by reference in its entirety.

BACKGROUND

In today's technological environment, 3-D printing can be used to form pre-designed objects out of material. One method of 3-D printing that can be used is fused filament fabrication. In such a method, a continuous filament of material is forced out of a printer head to print an object layer by layer. The material chosen is typically a polymer that is moldable when heated and that can sufficiently bind and solidify upon cooling. A problem can thus arise during the solidification and cooling process, wherein a first layer of material for a printed object can often stick onto the surface on which it is printed. This can make the printed object difficult to remove, especially without damaging the 3-D printed object. The level of inconvenience is even greater when printing multiple objects in succession.

Embodiments of the invention address these and other problems, individually and collectively.

BRIEF SUMMARY

One embodiment of the invention may relate to a print surface for a three-dimensional object printer. The print surface may comprise an elastic first layer, a binding layer for securing the printing surface to the three-dimensional object printer; and an adhesive layer for adhering the first layer to the binding layer. Three-dimensional objects are printed onto the first layer by controlled extrusion of molten material. Printed objects can be obtained by decoupling the binding layer from the three-dimensional object printer and detaching the object from the first layer by applying bending moments.

One embodiment of the invention may relate to a 3D printer. The 3D printer can comprise a build base, an extrusion nozzle, and a printing surface removably coupled to the build base. The printing surface of the 3D printer may comprise a flex layer, a binding layer, and an adhesive layer connecting the flex layer to the binding layer. Molten material is extruded onto a surface of the flex layer during a print phase of the 3D printer.

One embodiment of the invention may relate to a method for printing a plurality of three-dimensional objects. The method can include the steps of securing a pliable build surface to a rigid structure of a printing apparatus using a binding mechanism of the pliable build surface, ejecting molten material through a nozzle of the printing apparatus, and accumulating the molten material onto the pliable build surface to extrude a three-dimensional object in the plurality of three-dimensional objects. Further steps can include unbinding the pliable build surface from the rigid structure of the printing apparatus, bending the pliable build surface, detaching the three-dimensionally printed object from the pliable build surface, and repeating previous steps to print additional three-dimensional objects in the plurality of three-dimensional objects.

DETAILED DESCRIPTION

Figure 1:
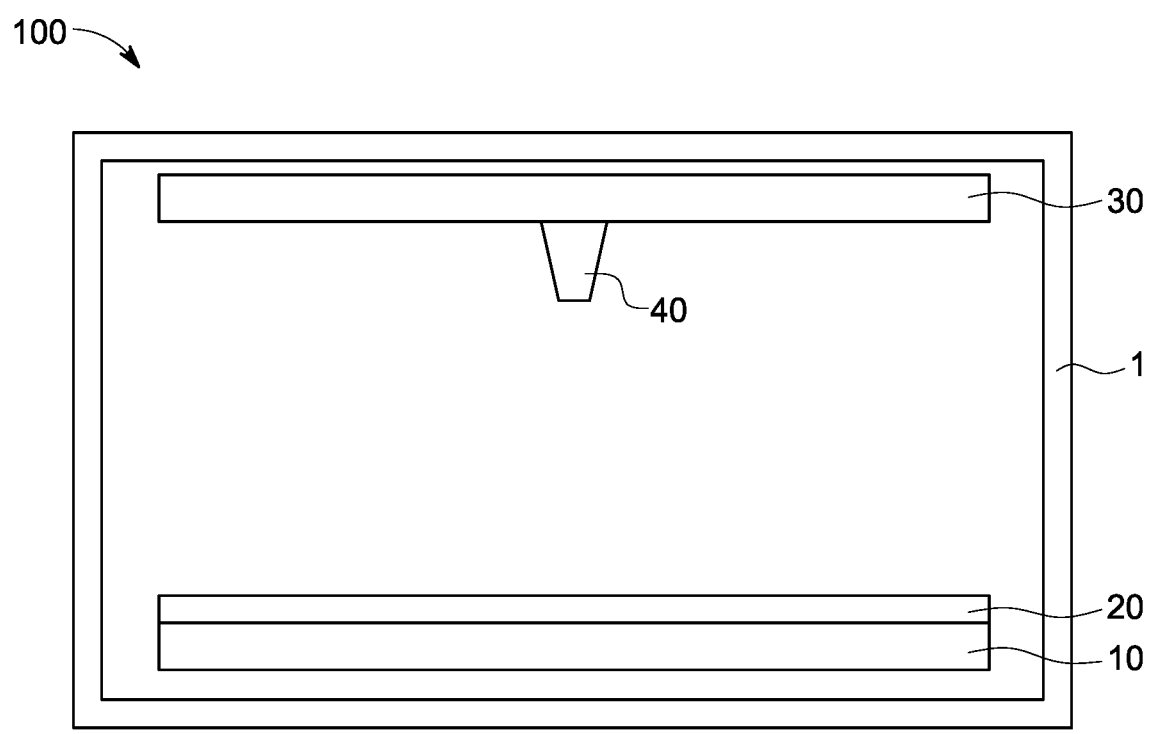
FIG. 1 shows a diagram for an exemplary 3-D printer according to embodiments.

As explained above, 3-D printed objects can be difficult to remove after printed material has cooled. To remedy the above stated problems, a pliable and reusable build surface can be provided for use with a 3-dimensional object printer. The pliable build surface may comprise a flex layer, an adhesive layer, and a binding layer. The flex layer may comprise a sufficiently elastic material. In one embodiment, the elastic material may be a heat resistant rubber, such as neoprene. The binding layer may be used to secure the pliable build surface to a rigid build base of the printer, which may be configured to retrieve heated printing material in a controlled manner. Material ejected from a nozzle during printing may be accumulated onto the pliable build surface as the 3-dimensional object begins to cool and take shape. The binding layer should be well-attached to the build base to maintain stability during controlled movements and provide an even print.

During an operational phase of the printer, printing material may be acclimated onto the flex layer of the pliable build surface. Important properties of the flex layer may include its elasticity, surface roughness, thermal resistance, thermal conductivity, melting point, thickness, and dimensional shape, as described in greater detail below. At the completion of the operational phase, the entirety of a printed object model is extruded and sufficiently cooled and solidified onto the flex layer. The pliable build surface is then released from the rigid build base by decoupling of the binding mechanism provided by the binding layer, which in one implementation, may be magnetic.

Due to the flexibility of the pliable build surface material, the 3-D printed object can be easily removed from the pliable build surface by flexing, bending, and/or peeling from underneath the printed object. The pliable material allows for simple removal of the printed object, whereas conventional rigid build surfaces may often strongly bind to a bottom layer of the printed object.

As such, in embodiments, no tool or exorbitant amount of force is required for removing the printed object, and thus damage to the printed object may also be limited. Upon removal of a first completed object, the pliable build surface can be reattached to the rigid build base via the binding mechanism and can then be re-used for printing subsequent 3-D printed objects, such as additional components for a modular toy or other multiple-component CAD model. Properties of the pliable build surface layers allow for both stability of print, efficient removal of printed objects, and long-lasting reusability.

Before further describing embodiments, it may be useful to define some relevant terms.

A "3-dimensional model" or "3D model" may refer to a computer-generated model having a specified form in three-dimensions. For example, the 3D model may have distinct specifications and size. A "3D printed object" may refer to an object printed according to a 3-dimensional model. For example, a 3-dimensional model may be associated with printing instructions which a 3D printer can execute to build the object. Objects can include everyday objects, replacement parts, toys, or any other specified component.

"3D printing" may refer to printing of a 3-dimensional model. 3-D printing can be achieved using a variety of techniques. Techniques commonly known in the art may include fused deposition modeling (FDM), selective laser melting (SLM), electronic beam melting (EBM), laminated object manufacturing (LOM), binder jetting (BJ), among others. A "3-dimensional object printer" or "3D printer" may refer to an apparatus for 3D printing. With respect to types of 3D printing, "Fused deposition modeling" and "fused filament fabrication" are sometimes used interchangeably. Some non-limiting examples of fused filament fabrication 3D printers include Createbot Supermini, Maker Replicator, Lulzbot Taz, Wanhao Duplicator i3, to name a few.

A "build surface" or "print surface" may refer to a surface onto which a 3D printed object is retrieved, collected, and/or maintained. As examples, a build surface can take the form of a tray or plate. A build surface can be provided as either part of a 3D printer or can be provided separately. For example, a build surface can come packaged with a printer or may be sold as a separate product.

A "print phase" or "operational phase" of a 3D printer may refer to a controlled process of printing a 3D model. The controlled process may include the execution of printing instructions for the 3D model by the 3D printer. For example, an operational phase can start when printing instructions are first initiated and may terminate when the model has been fully printed.

A "printer nozzle" or "nozzle" may refer to a 3D printer component for extruding material during a print phase. "Extrusion" may refer to a process of releasing print material onto a surface. In a 3D printing process, material can be extruded layer by layer to print a given model and form an object. Print material can be extruded through an aperture of the nozzle, which may have a predetermined diameter configurable to the printer and properties of the desired model. Print material can either be pre-heated before extrusion from the nozzle and/or the nozzle itself may be heated.

Embodiments of the invention will now be described in greater detail. FIG. 1 shows a diagram for an exemplary 3-D printer according to embodiments. Printer apparatus 100 may comprise a printer body (1), a build base (10) coupled to the printer body (1), and a pliable build surface (20) that can be temporarily attached, detached, and reattached to the build base (10) as further described below. Printer apparatus 100 may further comprise a printer head structure (30) above the build base (10), which may include a gantry or other structure for controllably moving a nozzle (40) as it ejects molten material during a print process.

A processor of the 3D printer may execute printing instructions for a 3D model. The instructions may be, for example, predetermined and timed control movements performed at the printer head structure (30) and a controlled flow rate of extruding material through the nozzle (40). Thus, a 3D model can be printed layer by layer to form a 3D object. In one embodiment, movement of the rigid build base (10) may also be controllable by the processor. For example, an actuator of printer apparatus 100 may be configured to slide the rigid build base (10) closer or farther away from nozzle (40) during a printing process. In one embodiment, printing instructions may be sent to printing apparatus 100 over a network (e.g. WiFi, Bluetooth, etc.). As such, printing apparatus 100 may further comprise one or more network interfaces and one or more memory stores.

In embodiments, a molten printing material, which may be a thermoplastic substance or other polymer filament that can be fed into printer 100, may be ejected from nozzle (40) and may accumulate on the pliable build surface (20) to extrude a three-dimensional object of predetermined shape. In embodiments, the pliable build surface (20) may comprise a rubber-like and/or semi-rigid heat-resistant material that can be flexed and/or bent. In one embodiment, the heat-resistant material may have a thermal conductivity at 25 degrees Celsius that is less than 0.3 (W/mK), preferably between 0.14 and 0.2 (W/mK). In one embodiment, the flexible material of the pliable build surface (20) may be neoprene, silicone, and/or thermoset elastomer. In another embodiment, the flexible material may be a thermoplastic rubber. For example, the material may be a polymer blend or polymer mixture of rubber and plastic. In embodiments, the elastic/flexible material may be provided as a flex layer of the pliable build surface (20). In some embodiments, the Young's Modulus of the flex layer material may be less than 0.5 GPa. In one embodiment, the Young's Modulus of the flex layer material may preferably be between 0.01 and 0.1 GPa. In one embodiment, the Young's Modulus of the flex layer material can be as low as 0.001 GPa, such as in an implementation where the flex layer material comprises a silicone rubber or other silicon-based polymer, for example.

As previously mentioned, in one embodiment, the pliable build surface (20) may comprise neoprene. Neoprene may be an exemplary material for the pliable build surface (20) as its high melting point may allow for the prevention of erosion of the pliable build surface (20) resulting from excess heat emanating from the nozzle (40), thus ensuring reusability and without requiring additional coating or surface finish. In embodiments, the melting point of the flex layer material may be greater than 210 C. In some embodiments, the melting point of the flex layer may be greater than 260 C. Furthermore, the elasticity of neoprene may allow the pliable build surface (20) to absorb force in the case of a nozzle (40) and/or printer head structure (30) that has been calibrated too closely to the rigid build base (10), such that the build base (10) may not be scraped or damaged upon accidental contact with the nozzle (40). The elasticity of neoprene further prevents against stretching or warping of the pliable build surface (20) over time, thus adding to its reusability. In addition, glue can more easily be applied to neoprene rubber than other rubbers such as silicon, which may allow for secure adhesion of a magnet or other binding mechanism to the pliable build surface (20).

To ensure that a uniform shape may be maintained during the extrusion of the 3-dimensional object, it may be important for the pliable build surface (20) to be securely attached to the rigid build base (10). In embodiments, this may be achieved through a binding mechanism of the pliable build surface (20). For example, one or more magnets, clips, suction devices, re-usable adhesive, and/or screw may be used. In one embodiment, the rigid build base (10) may comprise magnetic material, and the binding mechanism of the pliable build surface (20) may comprise a magnetic sheet adhered to a bottom surface of the pliable build surface (20) (e.g. using glue or other adhesive). Thus, the pliable build surface (20) may naturally bind to a top surface of the rigid build base (10) when allowed to remain in close proximity.

Once the entirety of molten material for the extruded object has been ejected from the nozzle and has accumulated and sufficiently cooled/solidified on the pliable build surface (20), a removal process may be performed to obtain the 3-D printed object.

Figure 2A:
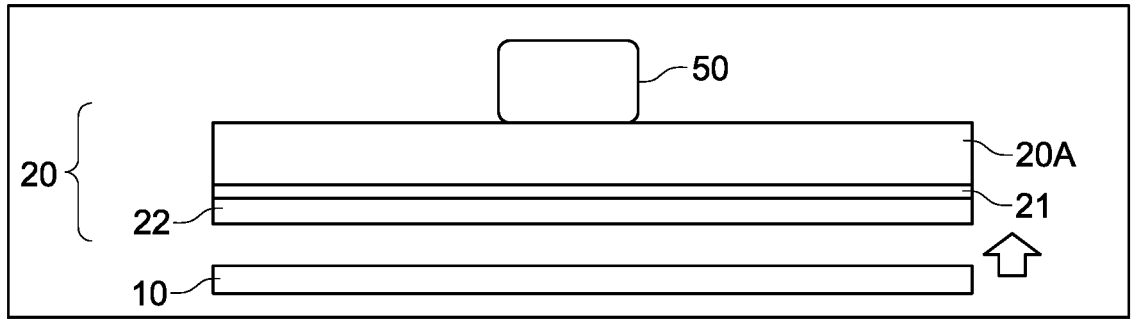
FIG. 2A and FIG. 2B show diagrams for removing an extruded object from a pliable build surface according to an embodiment.
Figure 2B:
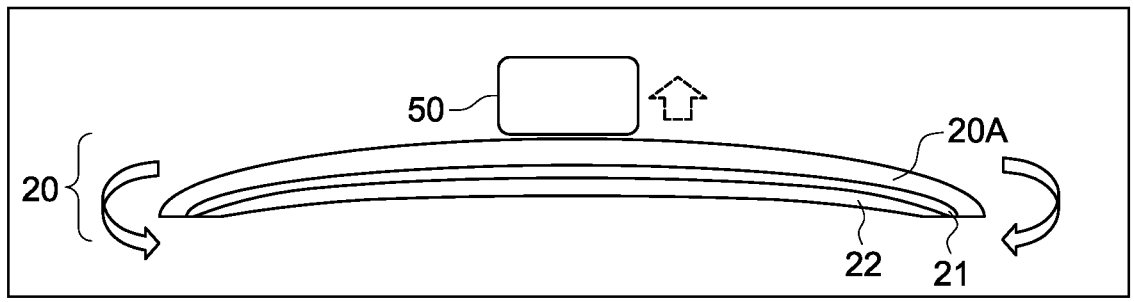

FIG. 2A and FIG. 2B show diagrams for removing an extruded object from a pliable build surface according to an embodiment. In embodiments, a pliable build surface (20) may comprise a flex layer (20A), an adhesive layer (21), and a binding layer (22). The flex layer (20A) may be a top layer or first layer of build surface (20), wherein material extruded from a nozzle during printing may acclimate onto the flex layer (20A). The adhesive layer (21) may be a thin layer of adhesive. In one embodiment the adhesive layer (21) may comprise a glue. For example, the adhesive layer (21) may comprise a resin, hot melt adhesive, contact spray acrylic, anaerobic adhesive, epoxy adhesive, or pressure adhesive.

In FIG. 2A, an extruded object (50) may be formed on a top surface of flex layer (20A). The removal process may include first decoupling the pliable build surface (20) from rigid build base (10). As previously explained, a binding mechanism of binding layer (22) of the pliable build surface (20) may be secured to rigid build base (10), and the pliable build surface (20) may be decoupled from build base (10) by unsecuring the binding mechanism. In one embodiment, the binding layer (20) may consist of a magnetic sheet which in itself can act as the binding mechanism when coupled to a build base (10) comprising of magnetic material. In such an implementation, to unsecure the binding layer (22), the pliable build surface (20) may simply be lifted from the top surface of build base (10) by an operating user, so as to create a separation distance between the magnetic sheet and the build base (10). In one embodiment, the binding layer (22) may also be flexible. For example, the binding layer (22) may be a flexible magnetic sheet having a similar elasticity to that of the flex layer (20A), but of a different material than that of the binding layer (22) (e.g. magnetic vinyl). In some embodiments, the binding layer (22) may have a substantially lower thickness than the flex layer (20A). In an embodiment, the thickness of the binding layer (22) may be less than half of the thickness of the flex layer (20A). In some embodiments, the thickness of the binding layer (22) can be less than 1 mm. In one embodiment, the thickness of the binding layer (22) may be between 0.01 and 0.5 mm. In one implementation, the binding layer (22) may be flexible and have a greater thickness than to that of the flex layer (20A). For example, in the implementation, the binding layer may be about 3 mm thick, while the flex layer (20A) may be about 0.5 mm thick.

In FIG. 2B, the pliable build surface (20) may be bent and/or flexed such that the bottom layer of the extruded object (50) may begin to peel from the top surface of the pliable build surface (20), and the extruded object (50) may then be easily detached. As explained above, the pliable build surface (20) may comprise neoprene, which has a number of technical advantages. For example, neoprene is slick enough that extruded thermoplastics can be peeled off easily after cooling and hardening. At the same time, neoprene may stick sufficiently to a bottom layer of extruded object (50) during accumulation of the molten material on the pliable build surface (20), such that uniform shape and consistent results may still be maintained. This may absolve the need for masking tape or other cover materials typically used to maintain the printed molten material on building surfaces of prior 3-D printing methods. Furthermore, the elasticity of neoprene and of similar elastomers (e.g. other polymers having similar elastic properties) allows for greater bending moments compared to, for example, some plastics and other materials of higher rigidity, thereby making it easier to peel off the extruded object (50).

Figure 3:
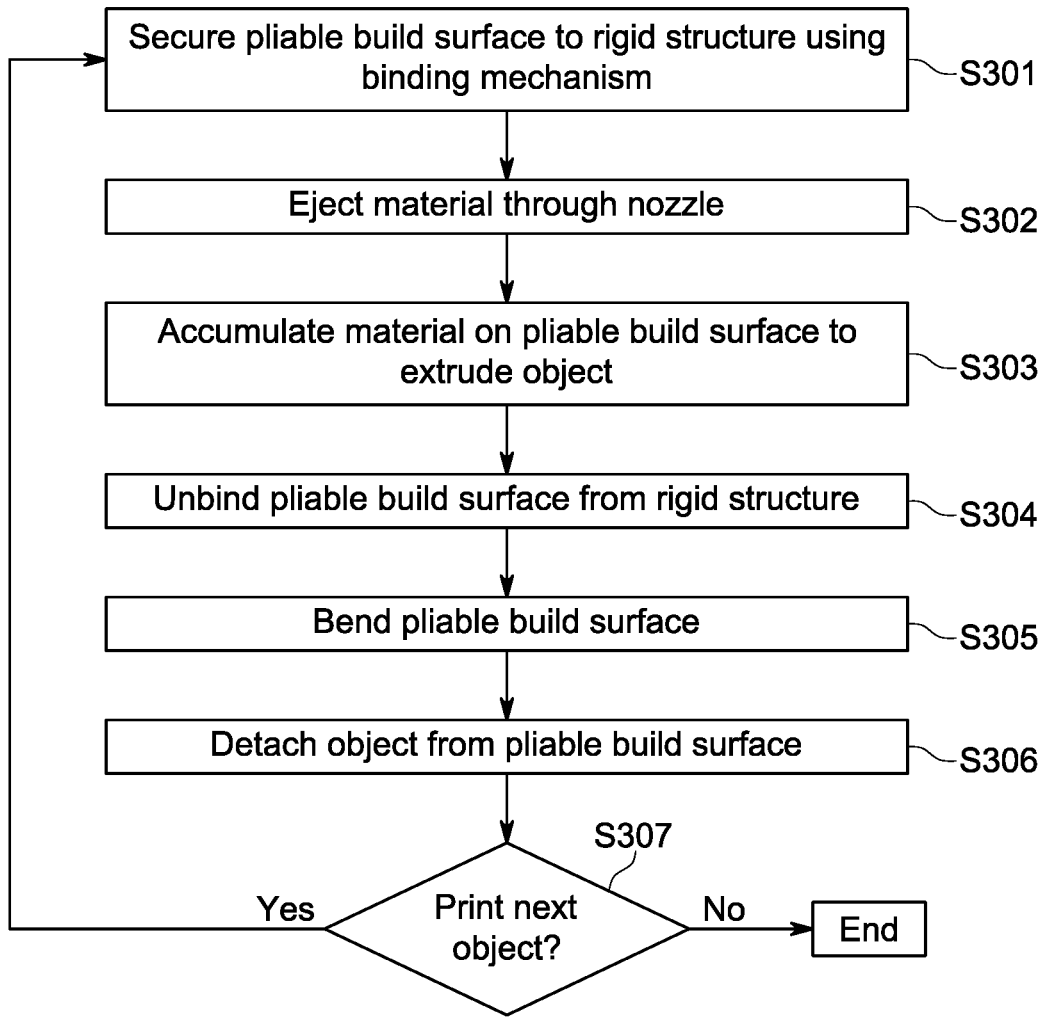
FIG. 3 shows a flow diagram for a method of printing a printing a plurality of 3-D printed objects according to embodiments.

FIG. 3 shows a flow diagram for a method of printing a printing a plurality of 3-D printed objects according to an embodiment. At step 301, the pliable build surface (20) may be secured to the rigid build base (10) using the binding mechanism (22). For example, the pliable build surface (20) may be set on the top surface of the rigid build base (20), such that binding mechanism (22) may magnetically engage with the rigid build base (20).

At step 302, molten material may be ejected through a nozzle (40) of the printing apparatus 100. For example, a thermoplastic filament may be fed into the printing apparatus 100 and may be heated and forcibly pushed out of the nozzle (40).

At step 303, the molten material may accumulate on the pliable build surface (20) to extrude a 3-dimensional object of predetermined shape. For example, printing instructions stored or sent to printing apparatus 100 may control the timing and amount of molten material ejected at certain instances, and the ejected molten material may accumulate layer by layer until the final 3-D object has been formed.

At step 304, the pliable build surface (20) may be decoupled from the rigid build base (10). For example, the pliable build surface (20) may be lifted from on top of the build base (10), such that a distance between the build base (10) and a magnetic binding mechanism (22) adhered to the bottom of pliable build surface (20) may be increased and therefore the magnetic force between them weakened.

At step 305, the pliable build surface (20) on which the extruded object has been formed on may be bent, flexed, and/or peeled from underneath the extruded object. For example, a user may manually bend at ends of the pliable build surface (20), so as to pull the pliable build surface (20) away from a bottom layer of the extruded object. In one embodiment, a conveyor-like system may be employed, in which the pliable build surface (20) may be wrapped around a pulley-system, such that the motion of the pulleys may create the bending motion for peeling off the pliable build surface (20) from underneath the extruded object.

At step 306, the three-dimensional object may be detached from the pliable build surface (20) (e.g. manually by the user). At step 307, it may be determined if an additional object is to be 3-D printed. If so, the process may be repeated again at step 301. Otherwise, the printing process may be complete and may be ended by the user. This process can be continuously repeated to print additional objects. Thus, the method is well-suited for printing multiple objects in succession. The method is efficient and does not require a highly skilled or very strong user. This may be a useful method for printing components for a modular children's toy, where the child can themselves perform the method and print their own toys.

Figure 4A:
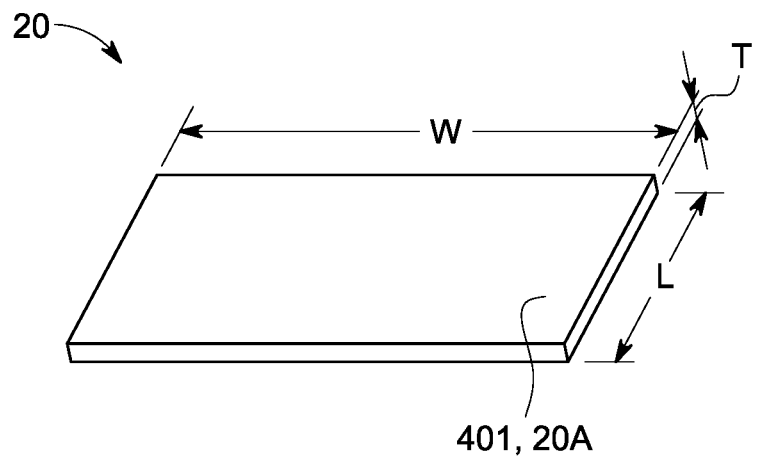
FIG. 4A, FIG. 4B, and FIG. 4C show illustrative examples of a build surface according to an embodiment of the invention.
Figure 4B:
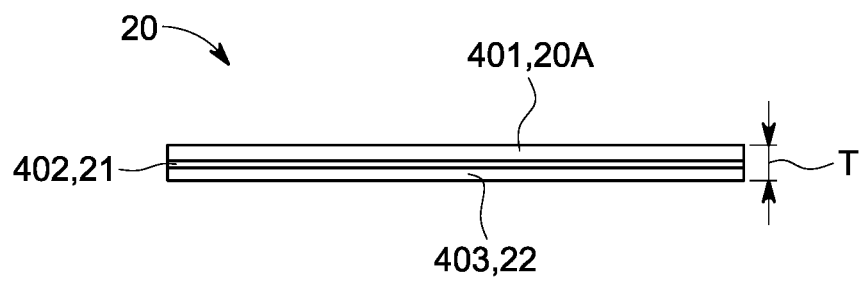
Figure 4C:
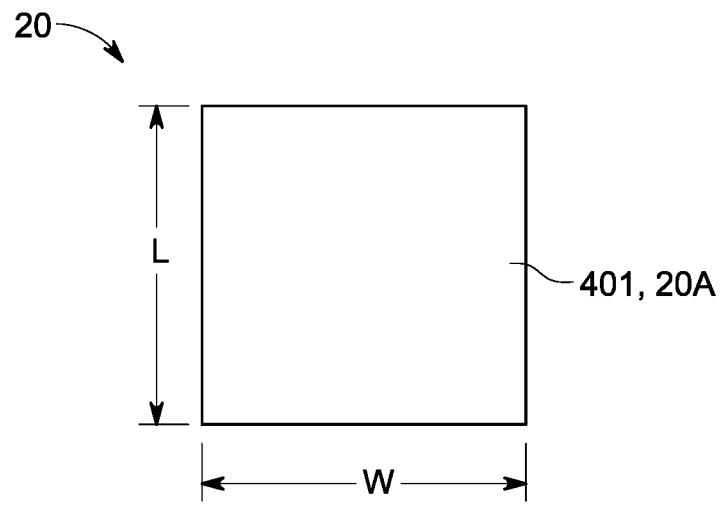

FIGS. 4A, 4B, and 4C show illustrative examples of a printing surface according to an embodiment of the invention. FIG. 4A shows a perspective view of a build surface (20). The build surface may have a width (w), length (l), and a thickness (t). In one embodiment the width and length may be about the same length. For example, the build surface may be a 4 inch by 4 inch square. In one embodiment, the thickness of the build surface may be about 3 mm. In FIG. 4A, a top surface (401) of the build surface is shown. In embodiments, the top surface (401) may be a flex layer (20A), as previously described.

FIG. 4B shows a side view of the build surface (20). In addition to the top surface (401), a middle layer (402) and bottom layer (403) are shown. In embodiments, the middle layer (402) may be an adhesive layer (21) and the bottom layer (403) may be a binding layer (22), as referenced in previous figures. FIG. 4C shows a top view of the binding surface (20). During printing, a nozzle overhead of the build surface (20) may eject material onto the area of the top surface (401) shown. The 3D printer may be configured to print around the center of this area, such that printed object may be substantially centered on top surface (401). This may make removal of the object from the build surface (20) even easier when bending moments are applied at the sides of build surface (20), so as to detach the object by generating a force at its center.

Figure 5:
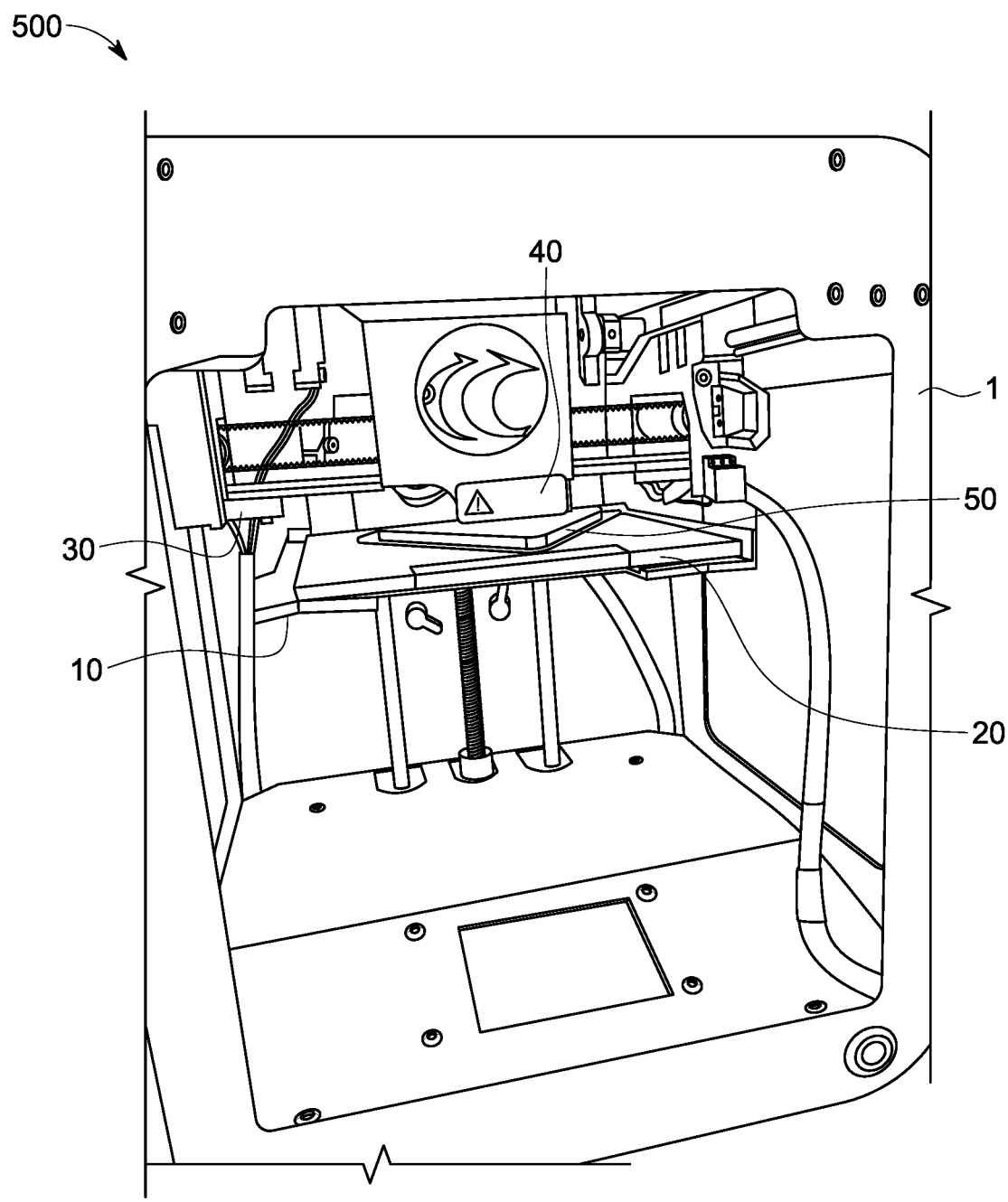
FIG. 5 shows an illustrative example of a 3-D printer according to an embodiment of the invention.

FIG. 5 shows an illustrative example of a 3-D printer according to an embodiment of the invention. The 3-D printer comprises a printer body (1). The build base (10) is situated below the nozzle (40), and may be controllable moved towards and away from the nozzle as the print progresses. Removably coupled to the build base (10) is the build surface (20). The build surface (20) may be directly below nozzle (40) so as to catch extruded material ejected from the nozzle. The extruded material forms onto the build surface (20) during the print of a 3D model. The nozzle (40) may be coupled to printer head structure (30). The printer head structure (30) may be fixed to the printer body (1). During the print, printing instructions performed by the 3D printer may cause the 3D printer to move the nozzle (40) along the printer head structure (30) and around the area over the top surface of the build surface (20). For example, a processor can translate printing instructions into timed movements of a gantry mechanism in conjunction with the flow of heated printer material onto the build surface (40). As such, one or more three-dimensional objects (50) can be printed according to a predetermined model.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An uncoated fused-filament fabrication (FFF) build surface configured for a 3D printer, the uncoated FFF build surface comprising:
   a pliable, heat-resistant, thermoset rubber forming the uncoated FFF build surface: and
   a flexible magnet forming a bottom surface of the uncoated FFF build surface, wherein the uncoated FFF build surface is configured to retrieve material extruded from the 3D printer directly onto an uncoated top surface of the uncoated FFF build surface, and wherein the bottom surface of the build surface is configured to be removably coupled to the 3D printer, and wherein the ratio of thickness between the uncoated FFF build surface and the flexible magnet is greater than 2:1.

2. The uncoated FFF build surface of claim 1, comprising neoprene rubber.

3. The uncoated FFF build surface of claim 1, with a thermal conductivity at 25 degrees Celsius that is less than 0.3 (W/mK) and a melting point greater than 210 degrees Celsius.

* * * * *